United States Patent [19]

Okuda et al.

[11] Patent Number: 4,764,224

[45] Date of Patent: Aug. 16, 1988

[54] BAKED FLUX FOR SUBMERGED ARC WELDING

[75] Inventors: Naoki Okuda, Kamakura; Yutaka Nishikawa, Fujisawa; Takakiyo Aoki, Fukuchiyama, all of Japan

[73] Assignee: Kabushiki Kaisha Kobe Seiko Sho, Kobe, Japan

[21] Appl. No.: 68,277

[22] Filed: Jul. 1, 1987

[30] Foreign Application Priority Data

Jul. 2, 1986 [JP] Japan ................................ 61-155655

[51] Int. Cl.$^4$ ............................................. B23K 35/34
[52] U.S. Cl. ........................................................ 148/26
[58] Field of Search ............................................ 148/26

[56] References Cited

U.S. PATENT DOCUMENTS

| | | | |
|---|---|---|---|
| 3,184,345 | 5/1965 | Kerekes | 148/26 |
| 3,826,695 | 7/1974 | Leicher | 148/26 |
| 4,017,339 | 4/1977 | Okuda | 148/26 |
| 4,338,142 | 6/1982 | Okuda | 148/26 |

Primary Examiner—Peter D. Rosenberg
Attorney, Agent, or Firm—Oblon, Fisher, Spivak, McClelland & Maier

[57] ABSTRACT

A baked flux of high basicity for submerged arc welding which has a chemical composition suitable for use in universal combination with various types of welding wires in welding low alloying steels. The baked flux reduces the oxygen content and diffusible hydrogen content of the weld metal to form a weld metal having a high toughness, enables forming regular beads without causing weld defects such as lack of fusion and slag inclusion, and facilitates welding work. The performance of baked fluxes is described in comparison with that of the conventional baked fluxes.

3 Claims, 3 Drawing Sheets

RESTRAINT WELDS

UNIT: mm

UNIT: mm

BAKED FLUX FOR SUBMERGED ARC WELDING

BACKGROUND OF THE INVENTION

1. Field of the Invention

The present invention relates to a baked flux for submerged arc welding and, more specifically, to a baked flux of high basicity for use in welding low-alloyed steels such as high-tensile steels, low-temperature steels and high-temperature steels, capable of depositing low-hydrogen and high-toughness weld metals in combination with various welding wires, and satisfactorily facilitating welding work.

2. Discussion of the Background

The recent increasing trend of the size of weldments has further enhanced the necessity of welding very thick high-tensile steel plates, and the requirement of low-temperature toughness of weld metals has become more severe. Accordingly, in constructing such a large weldment through submerged arc welding, it is necessary to use an optimum welding wire of appropriate composition to deposit a weld metal having sufficient tensile strength and toughness, and to use a flux capable of reducing oxygen content and diffusible hydrogen content of the weld metal and enabling safe welding work.

Fluxes for submerged arc welding are classified by manufacturing method roughly into three types, namely, fused fluxes, sintered fluxes and baked fluxes. The fused flux has been generally used from long ago. The fused flux is manufactured by uniformly fusing a material containing $SiO_2$, MnO, CaO, MgO and $CaF_2$ as principal components at a temperature of 1300° C. or above, cooling the material, and then crushing the fused and cooled material in an appropriate particle size according to purpose. The sintered flux is manufactured by solidifying a mixture of powder materials by water glass, granulating the solidified mixture in an appropriate particle size, and then heating the particles at a high temperature in the range of 800° to 1000° C. to remove the water of crystallization and volatile matters from the particles. The baked flux is manufactured by solidifying a mixture of a powder material, an alloying agent, a deoxidizing agent and an arc stabilizer by water glass, granulating the solidified mixture into particles, and then heating the particles at a temperature on the order of 500° C.

The baked flux, in particular, among those fluxes is able to contain carbonates such as $CaCO_3$ and $BaCO_3$. The metal carbonates contained in the baked flux are decomposed to produce carbon dioxide gas, which reduces the steam partial pressure of the arc atmosphere and remarkably reduces the diffusible hydrogen content of the weld metal as compared with other fluxes. As mentioned above, since the baked flux contains appropriate amounts of alloying agent and deoxidizing agent, and the alloying agent and the deoxidizing agent are not burnt during the manufacturing process, the baked flux enables the comparatively easy achievement of the adjustment of the chemical composition, deoxidization and fine crystallization of the weld metal.

However, the baked flux has some disadvantages as well as the above-mentioned advantages. As is disclosed in Japanese patent publication Nos. 56-53476 and 56-53477, the baked flux contains a large amount of MgO to increase the basicity. Accordingly, the baked flux is liable to cause weld defects, such as the deterioration of slag removability in the vicinity of the root of grooves, formation of convex beads and slag inclusion. Furthermore, as is disclosed in Japanese patent publication No. 57-31516, strict welding conditions must be satisfied to secure requisite properties of the weld metal, and hence the scope of the application of the baked flux is limited.

In addition to those problems, the conventional baked flux has a disadvantage that the baked flux is unable to provide expected effect unless the baked flux is used in combination with a welding wire having a specific composition. Accordingly, in view of the management of practical welding work, it has been desired to develop a flux which is applicable universally to welding various kinds of steel plates.

SUMMARY OF THE INVENTION

Accordingly, it is an object of the present invention to provide a baked flux for submerged arc welding, having the intrinsic functions of the baked flux, and capable of being applied to welding various low-alloyed steels in combination with various welding wires.

To achieve the object of the invention, the present invention provides a baked flux containing 2 to 10% ("%" represents "percent by weight" throughout) carbon dioxide equivalent carbonates, 12 to 24% $CaF_2$, 8 to 20% $Al_2O_3$, 20 to 40% MgO, 10 to 30% CaO, 7 to 27% $SiO_2$ and 1 to 7% $Na_2O$, $K_2O$ and/or $Li_2O$, meeting conditions: $1.5 \leq MgO/Al_2O_3 \leq 2.5$, $P \leq 0.03\%$, $S \leq 0.05\%$ and water extractable at 1000° C. $\leq 0.3\%$, and having a bulk specific gravity in the range of 0.8 to 1.3 g/cm³.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

Figure 1:
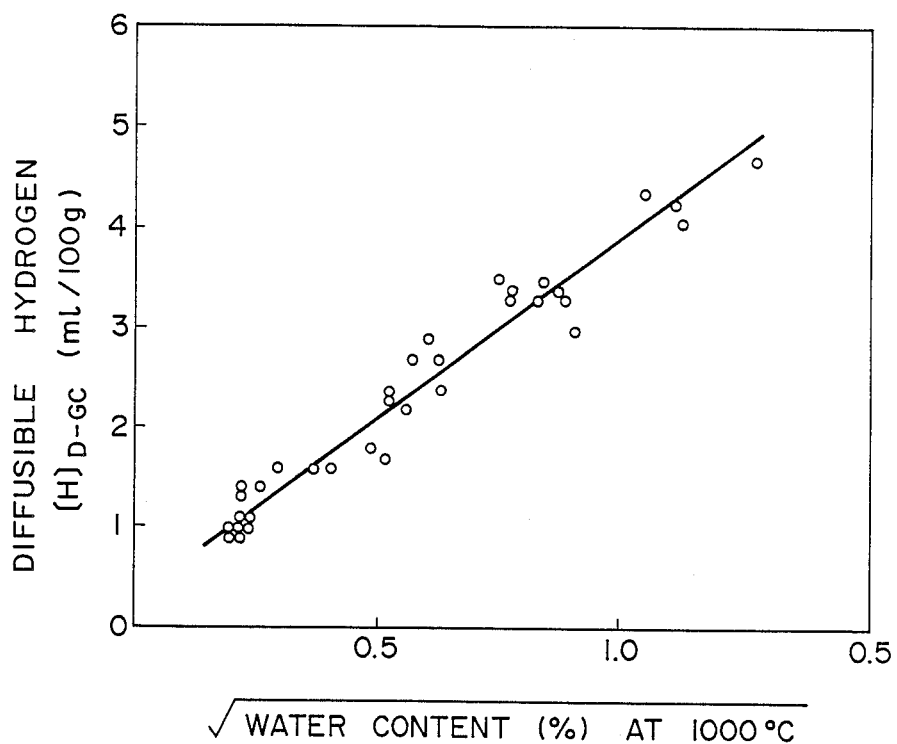
FIG. 1 is a graph showing the variation of diffusible hydrogen content of the weld metal with the content of water extractable at 1000° C. (hereinafter referred to as "1000° C. water content")

The restrictive conditions on the composition of the baked flux of the present invention will be described prior to the description of preferred embodiments.

Carbonate (2 to 10% $CO_2$ equivalent):

Carbonate is an essential component of a baked flux, which is decomposed by welding heat and produces $CO_2$ gas to reduce the steam partial pressure in the arc atmosphere to reduce the diffusible hydrogen content of the weld metal. Possible carbonates are $CaCO_3$, $MgCO_3$, $BaCO_3$ and other various carbonates. The $CO_2$ equivalent content of carbonate must be in the range of 2 to 10%. When the content is less than 2%, the diffusible hydrogen reducing effect of the carbonate is insignificant and, when the content is more than 10%, pockmarks develop over the surface of beads or convex beads are formed causing remarkable deterioration of the facility of welding work.

The most preferable carbonate is $CaCO_3$, which serves as a source of CaO as will be described hereinafter, and effectively increases the basicity of the slag.

$MnCO_3$ is decomposed and produces MnO which effectively increases the basicity of the slag. However, since excessive MnO deteriorates the shape of beads, it is preferable to take the relation of $MnCO_3$ with other components into consideration and to use the same if circumstances permit.

$MgCO_3$ is decomposed and produces MgO. It is necessary to determine the content of $MgCO_3$ so that the total of MgO produced from $MgCO_3$ and MgO produced from other components other than carbonates does not exceed an appropriate content of MgO.

Thus, it is most appropriate that the baked flux contains $CaCO_3$ as a principal carbonate, and $BaCO_3$ and $MgCO_3$ as subsidiary carbonates.

$CaF_2$ (12 to 24%):

Fluorine gas produced by the decomposition of $CaF_2$ reduces the steam partial pressure in the arc atmosphere, which is effective for reducing the diffusible hydrogen content in the weld metal. In a slag of high basicity containing comparatively large amounts of MgO and CaO, $CaF_2$ reduces the oxygen content of the weld metal very effectively improving the toughness of the weld metal. This effect of $CaF_2$ is due to the arrest of oxygen produced by a reductive reaction in the slag by $CAF_2$:

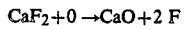

$$CaF_2 + 0 \rightarrow CaO + 2F$$

and the suppression of the migration of oxygen into the weld metal.

Other possible fluorides are NaF, $Na_3AlF_6$ and $MgF_2$ These fluorides other than $CaF_2$ reduce the diffusible hydrogen content of the weld metal, however, these fluorides are inferior to $CaF_2$ in respect of the effect of reducing the oxygen content of the weld metal and general effects affecting the facility of welding work. Accordingly, $CaF_2$ is only the effective fluoride. When the $CaF_2$ content is less than 12%, the foregoing effects of $CaF_2$ are insignificant. On the other hand, when the $CaF_2$ content is more than 24%, the arc becomes instable, the appearance of beads is deteriorated and a bad smell is produced. Accordingly, the $CaF_2$ must be in the range of 12 to 24%.

$Al_2O_3$ (8 to 20%)

$Al_2O_3$ functions as a slag forming agent and is necessary for improving the facility of welding work and for adjusting the basicity. The appropriate content of $Al_2O_3$ is dependent on the combined effect of $Al_2O_3$ and MgO as will be described hereinafter. However, the appropriate content is in the range of 8 to 20%. When the content of $Al_2O_3$ is less than 8%, the facility of welding work is not improved regardless of the content of MgO and, when the content is more than 20%, the removability of the slag deteriorates.

MgO (20 to 40%):

MgO increases the basicity of the slag. Fused high-basicity slag enhances the toughness of the weld metal effectively and absorbs dissolved hydrogen from the molten pool into the slag to reduce the diffusible hydrogen content of the weld metal very effectively. The content of MgO must be determined so that the content of MgO and that of $Al_2O_3$ are well balanced in respect of facility of welding work. However, in any case, the contents of MgO is less than 20%, the foregoing effect of MgO is insignificant and, when the content is more than 40%, the removability of the slag deteriorates remarkably, irregular beads are formed, beads are not deposited in the groove satisfactorily and weld defects such as undercut and slag inclusion are liable to occur. Ordinarily, magnesite is used as a compound for MgO, however, $MgCO_3$ may be used. When $MgCO_3$ is used, as mentioned above, the contents of $MgCO_3$ is limited in consideration of the amount of $CO_2$ gas. Olivine sand and bentonite are also possible minerals for MgO. In any case, the MgO equivalent content of those substances must be in the foregoing range.

$MgO/Al_2O_3$ ratio (1.5 to 2.5):

To increase the basicity of the slag to enhance the toughness of the weld metal by reducing the oxygen content of the weld metal, the MgO content of the baked flux must be comparatively large. However, excessive MgO spoils the facility of welding work as mentioned hereinbelow. To solve these contradictory problems, the influence of the $MgO/Al_2O_3$ ratio on the facility of welding work was examined, and it was found that the influence of the $MgO/Al_2O_3$ ratio on the facility of welding work is significant. It was confirmed through experiments that the $MgO/Al_2O_3$ ratio in the range of 1.5 to 2.5 improves the facility of welding work remarkably.

When the ratio is less than 1.5, the basicity of the slag is reduced, the oxygen content of the weld metal increases and the low-temperature toughness of the weld metal is reduced. On the other hand, when the ratio is more than 2.5, the effect of $Al_2O_3$ is insignificant, and the removability of the slag and the shape of beads deteriorate remarkably.

Thus, it is the most significant feature of the present invention that the baked flux of the present invention has a comparatively high MgO content to increase the basicity of the slag and contains an amount of $Al_2O_3$ for improving the facility of welding work, meeting a fixed $MgO/Al_2O_3$ ratio. In any case, the $Mgo/Al_2O_3$ ratio must be in the above-mentioned appropriate range.

CaO (10 to 30%):

CaO, similarly to MgO, is effective for increasing the basicity of the slag, reducing the diffusible hydrogen content of the weld metal and enhancing the toughness of the weld metal. From the view point of improving the facility of welding work, it is more effective for increasing the basicity of the slag to include CaO in the baked flux in addition to MgO than including only MgO in the baked flux.

When the CaO content is less than 10%, the effect of CaO is insignificant and, when the Cao content is more than 30%, the appearance of beads becomes irregular and the facility of welding work is spoiled.

Ordinarily, a compound for CaO is $CaCO_3$. However, if all the amount of CaO is provided by $CaCO_3$, the amount of $CO_2$ gas exceeds the upper limit of an appropriate range. Accordingly, it is necessary to provide a necessary amount of CaO by both $CaCO_3$ and wollastonite. The necessary amount of CaO may be provided by other minerals containing CaO, such as dolomite. However, in any case, the CaO eqivalent content of those minerals must be in the range of 10 to 30%

$SiO_2$ (7 to 27%):

$SiO_2$ is an essential component for the defectless welding which reduces the basicity of the slag, lowers the melting point of the slag, and enables forming uniform beads. For such effects, the appropriate range of $SiO_2$ content is 7 to 27%. When the content is less than 7%, the foregoing effects are insignificant and, when the content is more than 27%, the basicity of the slag is reduced remarkably, the beads are coated with glassy slag and the facility of welding work is spoiled remarkably.

Wollastonite which provides CaO also provides $SiO_2$. Other minerals such as silica sand and feldspar are included in the baked flux as subsidiary minerals for providing $SiO_2$. Water glass contained as a granulating material also provides $SiO_2$. In any case, the total amount of $SiO_2$ must meet a $SiO_2$ content in the range of 7 to 27%.

$Na_2O$, $K_2O$ and/or $Li_2O$ (1 to 7%):

These components are arc stabilizers, which reduces the interfacial tension of the slag and adjusts the appearance of beads properly.

When the total content of one or a plurality of these components is less than 1%, the foregoing effect of those components is insignificant and, when the content is more than 7%, convex beads are formed and the facility of welding work is spoiled. Ordinarily, those components are provided by water glass; other suitable minerals such as feldspar and caolin may be included in the baked flux as subsidiary sources of those components.

$P \leq 0.03\%$ and $S \leq 0.05\%$:

As mentioned above, the respective contents of those components of the baked flux of the present invention must be adjusted properly. Moreover, the P content and S content of the baked flux need to be limited. P and S contained in the baked flux increases the P content and S content of the weld metal, so that the toughness of the weld metal is reduced and the possibility of hot cracking is increased.

Naturally, the P content and S content of the welding wire must be taken into consideration in addition to those of the baked flux to control the P content and S content of the weld metal. Since one of the objects of the present invention is to provide a baked flux capable of being used in combination with an optional welding wire and universally applicable to welding various types of steels, the P content and S content of the baked flux must be controlled strictly.

The baked flux of the present invention is a baked flux of high basicity having a high MgO content and a high CaO content and hence desulfurization reaction is expected during welding. Accordingly, the upper limit of the S content is decided at a comparatively high value of 0.05%. On the other hand, since dephosphorization reaction is scarcely expected, the upper limit of the P content is decided at a low value of 0.03%, which is stricter than the limitation for the S content. Since the inclusion of S and P in the material as impurities is unavoidable, it is necessary to choose materials of high quality to meet the limitations for the S content and P content.

1000° C. Water content (0.3% or below):

The baked flux of the present invention is a baked flux of high basicity which produces a large amount of $CO_2$ gas during welding, and hence the diffusible hydrogen content of the weld metal is reduced necessarily to a very low level. However, in welding high tensile steels such as HT80 steel and HT100 steel, it is necessary to reduce the diffusible hydrogen content $[H]_{D\text{-}GC}$ of the weld metal as measured by gas chromatography to 2 ml/100 g or below.

FIG. 1 is a graph showing the relation of the diffusible hydrogen content $[H]_{D\text{-}GC}$ of the weld metal to the square root of 1000° C. water content of the baked flux. The diffusible hydrogen content was measured in conformity with WES-1003-1984, while the 1000° C. water content was measured in conformity with AWS A5.5. The flux was dried at 350° C. for one hour for the measurement of 1000° C. water content.

As is obvious from FIG. 1, the 1000° C. water content of the baked flux must be 0.3% or below to reduce the diffusible hydrogen content of the weld metal to 2 Ml/100 g or below. To reduce the 1000° C. water content of the baked flux to 0.3% or below, it is necessary to use materials not containing water of crystallization and, when necessary, to remove the adsorbed water, water of crystallization and absorbed water completely by baking the raw materials. A desirable flux baking temperature is in the range of 450° to 580° C. The water cannot be effectively removed when the baking temperature is below the lower limit of the temperature range, while the carbonates are decomposed when the baking temperature is in excess of the upper limit of the temperature range.

Bulk Specific Gravity (0.8 to 1.3 $g/cm^3$):

The bulk specific gravity of the baked flux of the present invention must be in the range of 0.8 to 1.3 $g/cm^3$.

When the bulk specific gravity is less than 0.8 $g/cm^3$, the grain strength is insufficient and the flux is pulverized through repeated use to spoil the facility of welding work and to spoil the environmental conditions. When the bulk specific gravity is more than 1.3 $g/cm^3$, the baked flux is unable to spread satisfactorily over the groove and pockmarks are formed to spoil the facility of welding work remarkably. The bulk specific gravity was measured by a compression packing method in conformity with a bulk specific gravity measuring method specified in JIS K6721 (Vinyl Chloride Test Method).

When necessary, the baked flux of the present invention may contain further additives such as alloying metals, for example, Fe-Mo, Cr and Ni, and a deoxidizer, for example, Fe-Mn or Fe-Si. However, since these additives are liable to cause the segregation and variation in composition of the weld metal depending on welding conditions, it is desirable not to add such additives to the baked flux and, when added, the total content of such additives must be 10% or below.

Other features of the invention will become apparent in the course of the following descriptions of exemplary embodiments which are given for illustration of the invention and are not intended to be limiting thereof.

EXAMPLES

The utility of the baked flux of the present invention was confirmed through various experiments. The respective chemical compositions of welding wires, steel plates (base metals) and baked fluxes used in the experiments are shown in Tables 1 to 3, respectively. The welding wires shown in Table 1 were copper plated. The baked fluxes shown in Table 3 were prepared by mixing raw materials, mixing water glass in the mixture of the raw materials, and granulating the mixture of the raw materials and water glass. In the baked fluxes, the particle size of 70% of the particles are in the range of 12 to 65 mesh.

Figure 2:
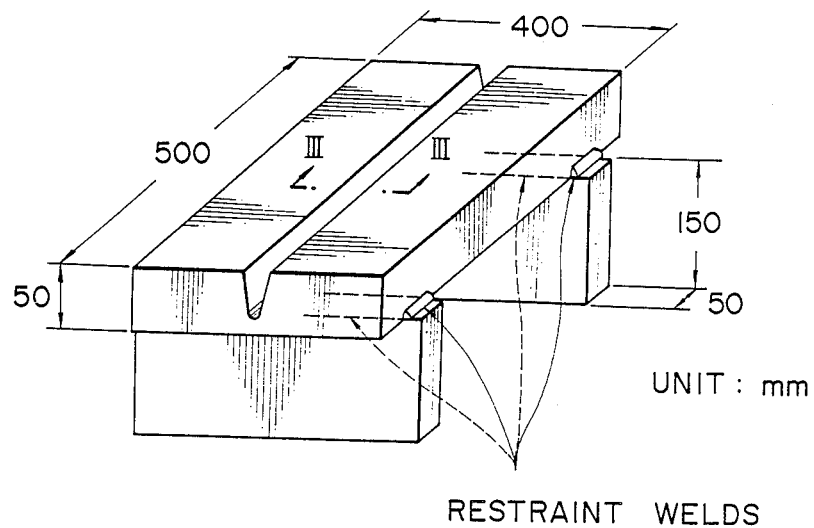
FIG. 2 is a perspective view of a test piece for a multilayer weld crack test.
Figure 3:
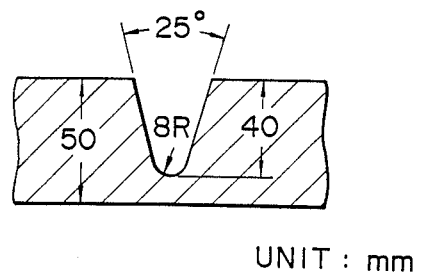
FIG. 3 is a sectional view taken on line III—III in FIG. 2.

The low-alloyed high tensile steel HT100 as a base metal shown in Table 2 was welded by using the welding wire W3 shown in Table 1 and baked fluxes F1 to F6 (examples) and baked fluxes F7, F22 and F23 (controls) under welding conditions noted below. Weld zones were subjected to multilayer weld crack test (U-type weld crack test). The shape of grooves of the test pieces are shown in FIGS. 2 and 3. Test results are tabulated in Table 4.

Welding conditions:
Welding current: 600 A
Welding voltage: 32 V
Welding speed: 30 cm/min
Preheating temperature: 100° C.
Interpass temperature: 150° C.
Heat input: 38.4 kJ/cm The weld zones were allowed to stand for seventy-two hours in the atmosphere, then reinforcements were removed by grinding, and then the weld zones were examined for weld cracks.

As apparent from Table 4, the baked fluxes of the present invention did not cause any weld crack attributable to the presence of hydrogen and enabled smooth welding work, whereas all the fluxes F7, F22 and F23 (controls) caused weld cracks attributable to the presence of hydrogen because the $CO_2$ of flux F7 is less than the lower limit and the respective 1000° C. water contents of the fluxes F22 and F23 are in excess of the upper limit, so that the diffusible hydrogen content of the weld metals became high. Flux F7 was unsatisfactory in respect to slag removability and in the facility of welding work.

TABLE 1

| Desig-nation | Diameter (mm) | Purpose | Chemical Composition (% wt.) | | | | | | | | | |
|---|---|---|---|---|---|---|---|---|---|---|---|---|
| | | | C | Si | Mn | P | S | Ni | Cr | Mo | Ti | B |
| W1 | 4.0 | Low temperature steel | 0.09 | 0.24 | 1.84 | 0.010 | 0.007 | — | — | — | 0.046 | 0.0052 |
| W2 | 4.0 | HT80 | 0.12 | 0.30 | 1.92 | 0.006 | 0.004 | 2.52 | 0.24 | 0.82 | — | — |
| W3 | 4.0 | HT100 | 0.14 | 0.32 | 2.20 | 0.004 | 0.002 | 2.84 | 0.85 | 0.92 | — | — |

TABLE 2

| Type | Thickness (mm) | Chemical composition (% wt.) | | | | | | | | |
|---|---|---|---|---|---|---|---|---|---|---|
| | | C | Si | Mn | P | S | Ni | Cr | Mo | B |
| A516 Gr70 | 50 | 0.15 | 0.22 | 1.42 | 0.013 | 0.007 | — | — | — | — |
| H T80 | 50 | 0.12 | 0.32 | 1.10 | 0.008 | 0.005 | 1.23 | 0.34 | 0.52 | — |
| H T100 | 50 | 0.10 | 0.26 | 1.04 | 0.003 | 0.002 | 0.92 | 0.64 | 0.62 | 0.0025 |

TABLE 3

| Fluxes No. | $CO_2$ | $CaF_2$ | $Al_2O_3$ | MgO | CaO | $Na_2O$ | $K_2O$ | $Li_2O$ | $SiO_2$ | P | S | Deoxidizer and Alloying Elements | Other Elements | 1000° C. Water Content |
|---|---|---|---|---|---|---|---|---|---|---|---|---|---|---|
| F1 | 5 | 18 | 15 | 23 | 19 | 1.8 | 1.4 | — | 13 | 0.018 | 0.026 | — | 3.7 | 0.12 |
| F2 | 7 | 14 | 17 | 26 | 18 | 1.5 | 1.0 | 0.3 | 9 | 0.024 | 0.038 | 2.0 | 3.9 | 0.08 |
| F3 | 4 | 13 | 12 | 24 | 20 | 1.2 | 1.2 | 0.2 | 20 | 0.015 | 0.022 | 2.0 | 2.3 | 0.07 |
| F4 | 9 | 15 | 13 | 23 | 21 | 0.8 | 0.9 | — | 16 | 0.016 | 0.018 | — | 2.2 | 0.11 |
| F5 | 3 | 14 | 17 | 36 | 13 | 1.2 | 0.5 | — | 8 | 0.016 | 0.020 | 4.0 | 2.8 | 0.07 |
| F6 | 3 | 13 | 9 | 21 | 26 | 0.5 | 0.7 | — | 25 | 0.022 | 0.043 | 0.7 | 1.0 | 0.03 |
| F7 | 1 | 13 | 12 | 27 | 21 | 1.2 | 1.1 | — | 24 | 0.024 | 0.032 | — | 0.5 | 0.14 |
| F8 | 12 | 21 | 10 | 22 | 20 | 1.2 | 1.2 | 0.2 | 8 | 0.012 | 0.011 | — | 4.3 | 0.07 |
| F9 | 5 | 9 | 15 | 28 | 13 | 1.2 | 0.8 | — | 25 | 0.014 | 0.009 | — | 2.8 | 0.06 |
| F10 | 5 | 27 | 11 | 23 | 13 | 1.2 | 1.8 | — | 9 | 0.018 | 0.041 | 4.5 | 3.9 | 0.12 |
| F11 | 6 | 22 | 5 | 22 | 18 | 2.2 | 2.6 | 0.4 | 10 | 0.009 | 0.008 | 4.0 | 7.5 | 0.13 |
| F12 | 5 | 13 | 22 | 39 | 11 | 0.7 | 0.7 | — | 8 | 0.014 | 0.013 | — | 0.5 | 0.08 |
| F13 | 5 | 20 | 10 | 16 | 22 | 1.8 | 2.0 | — | 16 | 0.015 | 0.025 | 3.0 | 4.1 | 0.06 |
| F14 | 3 | 13 | 18 | 43 | 12 | 0.6 | 0.6 | — | 8 | 0.016 | 0.008 | — | 1.6 | 0.11 |
| F15 | 4 | 22 | 16 | 30 | 7 | 0.9 | 1.0 | 0.4 | 10 | 0.007 | 0.026 | 4.5 | 4.1 | 0.10 |
| F16 | 6 | 13 | 4 | 20 | 32 | 0.7 | 0.7 | — | 23 | 0.014 | 0.035 | — | 0.5 | 0.07 |
| F17 | 3 | 14 | 17 | 36 | 13 | 0.3 | 0.5 | — | 15 | 0.022 | 0.041 | — | 2.1 | 0.04 |
| F18 | 3 | 14 | 12 | 27 | 14 | 3.8 | 4.1 | — | 8 | 0.014 | 0.026 | 4.8 | 8.9 | 0.24 |
| F19 | 9 | 14 | 18 | 33 | 15 | 1.6 | 1.5 | 0.3 | 5 | 0.026 | 0.036 | — | 2.5 | 0.06 |
| F20 | 3 | 4 | 9 | 21 | 30 | 1.3 | 1.2 | — | 30 | 0.008 | 0.012 | — | 0.5 | 0.12 |
| F21 | 5 | 21 | 18 | 24 | 14 | 1.3 | 1.2 | — | 8 | 0.014 | 0.016 | 3.0 | 4.4 | 0.20 |
| F22 | 5 | 18 | 15 | 23 | 19 | 1.8 | 1.4 | — | 13 | 0.018 | 0.026 | — | 3.7 | 0.36 |
| F23 | 5 | 18 | 15 | 23 | 19 | 1.8 | 1.4 | — | 13 | 0.018 | 0.026 | — | 3.7 | 0.55 |
| F24 | 5 | 18 | 15 | 23 | 19 | 1.8 | 1.4 | — | 13 | 0.018 | 0.026 | — | 3.7 | 0.08 |
| F25 | 5 | 18 | 15 | 23 | 18 | 1.6 | 1.5 | — | 12 | 0.038 | 0.024 | 1.5 | 4.2 | 0.06 |
| F26 | 5 | 18 | 15 | 23 | 17 | 1.4 | 1.4 | — | 13 | 0.017 | 0.062 | 3.2 | 2.7 | 0.11 |

| Fluxes No. | $MgO/Al_2O_3$ | Specific Gravity (g/cm$^3$) | $[H]_{D-GC}$** (ml/100 g) | Remarks | Fluxes | Deoxidizer and Alloying Elements (% wt.) | | | | | Remarks |
|---|---|---|---|---|---|---|---|---|---|---|---|
| | | | | | | Fe-45% Si | Fe-75% Mn | Ni | Cr | Fe-45% Mo | |
| F1 | 1.53 | 1.14 | 1.3 | Examples | F2 | 1.5 | 0.5 | — | — | — | Examples |
| F2 | 1.53 | 1.08 | 0.8 | | F3 | — | — | 0.5 | 1.5 | — | |
| F3 | 2.0 | 1.07 | 1.0 | | F5 | 2.0 | 1.0 | 1.0 | — | — | |
| F4 | 1.77 | 1.10 | 0.7 | | F6 | 0.7 | — | — | — | — | |

TABLE 3-continued

| | | | | | | | | | | | |
|---|---|---|---|---|---|---|---|---|---|---|---|
| F5 | 2.12 | 1.12 | 1.6 | | | | | | | | |
| F6 | 2.50 | 0.98 | 1.0 | | | | | | | | |
| F7 | 2.25 | 0.95 | 3.6 | Controls | F10 | 0.5 | — | 2.5 | — | 1.5 | Controls |
| F8 | 2.20 | 1.10 | 0.3 | | F11 | 1.0 | 0.5 | — | — | 2.5 | |
| F9 | 1.87 | 1.14 | 2.8 | | F13 | — | — | — | — | 3.0 | |
| F10 | 2.09 | 1.16 | 1.2 | | F15 | 2.0 | 1.0 | 1.5 | — | — | |
| F11 | 4.40 | 1.23 | 1.6 | | F18 | 0.8 | — | 1.0 | 2.0 | 1.0 | |
| F12 | 1.77 | 0.88 | 2.0 | | F21 | 2.0 | 1.0 | — | — | — | |
| F13 | 1.60 | 1.14 | 2.2 | | F25 | — | 1.5 | — | — | — | |
| F14 | 2.39 | 0.83 | 2.1 | | F26 | 1.0 | — | 1.2 | — | 1.0 | |
| F15 | 1.88 | 1.07 | 3.1 | | | | | | | | |
| F16 | 1.60 | 1.03 | 0.6 | | | | | | | | |
| F17 | 2.12 | 0.74 | 1.9 | | | | | | | | |
| F18 | 2.25 | 1.36 | 1.7 | | | | | | | | |
| F19 | 1.83 | 1.21 | 0.8 | | | | | | | | |
| F20 | 2.33 | 1.14 | 3.7 | | | | | | | | |
| F21 | 1.33 | 1.12 | 1.9 | | | | | | | | |
| F22 | 1.53 | 1.20 | 2.7 | | | | | | | | |
| F23 | 1.53 | 1.18 | 3.2 | | | | | | | | |
| F24 | 1.53 | 1.40 | 1.3 | | | | | | | | |
| F25 | 1.53 | 1.17 | 1.4 | | | | | | | | |
| F26 | 1.53 | 1.15 | 1.3 | | | | | | | | |

*$TiO_2$, BaO, $Fe_2O_3$, $ZrO_2$
**Content of diffusible hydrogen determined by gas chromatography

TABLE 4

Figure 4:
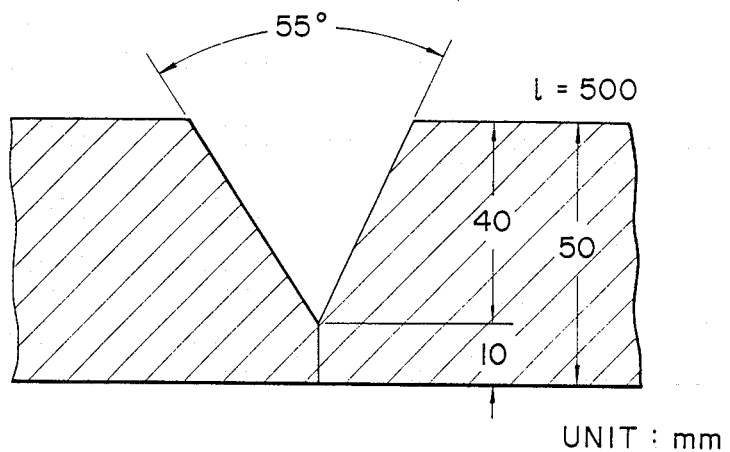
FIG. 4 is a typical illustration showing the shape of a groove formed in a base metal for a deposited metal impact test.
Figure 5:
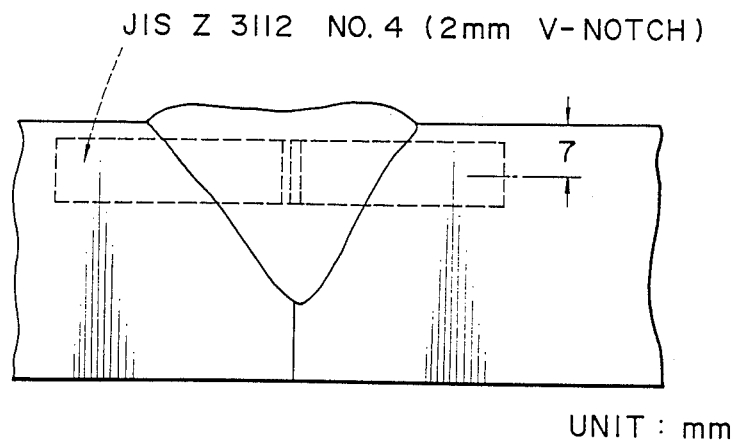
FIG. 5 is a typical illustration of assistance in explaining the manner of sampling a test piece for a deposited metal impact test.

| Fluxes | Cracks (U-Type Weld Crack Test) | Usability | |
|---|---|---|---|
| F1 | None | Good | Example |
| F2 | " | " | " |
| F3 | " | " | " |
| F4 | " | " | " |
| F5 | " | " | " |
| F6 | " | " | " |
| F7 | Cracked | Unsatisfactory slag removability | Control |
| F22 | " | Good | " |
| F23 | " | " | " | tests by using the welding wires W1 to W3, the steel plates (base metals) and the baked fluxes F1 to F26 shown in Tables 1 to 3 in various combinations as shown in Table 5. The weld metals were subjected to Charpy impact test ($-40°$ C.) and X-ray test and were evaluated with respect to the facility of welding work. The results of the tests and evaluation are tabulated in Table 5. The Charpy impact tests were executed in conformity to an impact test method for weld metal specified in JIS Z3112. The shape of the groove and the sampling position are shown in FIGS. 4 and 5, respectively.

The test results shown in Table 5 are summarized as follows:

TABLE 5

| Base Metals | Wires | Fluxes | Charpy Impact Test ($-40°$ C.) (kgf · m) | Usability | | X-Ray Test | Remarks |
|---|---|---|---|---|---|---|---|
| A516Gr70 | W1 | F1 | 14.8 | Good | | Good | Examples |
| HT80 | W2 | F2 | 10.6 | Good | | Good | |
| HT100 | W3 | F3 | 8.6 | Good | | Good | |
| A516Gr70 | W1 | F4 | 16.2 | Good | | Good | |
| HT80 | W2 | F4 | 10.2 | Good | | Good | |
| A516Gr70 | W1 | F5 | 15.2 | Good | | Good | |
| A516Gr70 | W1 | F6 | 15.9 | Good | | Good | |
| HT80 | W2 | F6 | 10.4 | Good | | Good | |
| HT100 | W3 | F6 | 8.7 | Good | | Good | |
| A516Gr70 | W1 | F8 | 12.4 | Bad | (Pockmarks, convex beads) | Lack of fusion | Controls |
| A516Gr70 | W1 | F9 | 3.2 | Bad | (Bad slag removability) | Good | |
| HT80 | W2 | F10 | 11.6 | Bad | (Irregular slag beads) | Slag inclusion | |
| HT80 | W2 | F11 | 7.4 | Bad | (Bad slag removability, convex beads) | Lack of fusion, slag inclusion | |
| HT80 | W2 | F12 | 3.2 | Bad | (Bad slag removability) | Good | |
| HT100 | W3 | F13 | 2.4 | Good | | Good | |
| HT100 | W3 | F14 | 8.2 | Bad | (Undercut, irregular beads) | Lack of fusion, slag | |
| A516Gr70 | W1 | F15 | 2.1 | Good | | Good | |
| A516Gr70 | W1 | F16 | 9.6 | Bad | (Irregular beads) | Lack of fusion | |
| HT80 | W2 | F17 | 9.2 | Bad | (Excessive powdering, irregular beads,) | Lack of fusion | |
| HT80 | W2 | F18 | 4.3 | Bad | (Unsatisfactory flow, convex beads, pockmarks) | Slag inclusion | |
| HT100 | W3 | F19 | 10.6 | Bad | (Convex beads) | Lack of fusion | |
| HT100 | W3 | F20 | 2.3 | Bad | (slag inclusion) | Good | |
| A516Gr70 | W1 | F21 | 2.6 | Bad | (Irregular beads) | Good | |
| HT100 | W3 | F24 | 8.7 | Bad | (Unsatisfactory flow, pockmarks) | Lack of fusion | |
| HT100 | W3 | F25 | 4.2 | Good | | Hot crack | |
| HT100 | W3 | F26 | 3.6 | Good | | Hot crack | |

Further experimental welding was carried out under the same welding conditions as those for the weld crack (1) The $CO_2$ content of the baked flux F8 is in excess of 10%. The baked flux F8 caused weld defects such as pockmarks in the surface of beads, convex beads and lack of fusion and spoiled the facility of welding work remarkably.

(2) The $CaF_2$ content of the baked flux F9 is less than 12%. The baked flux F9 reduced the low-temperature toughness of the weld metal, deteriorated slag removability and spoiled the facility of welding work.

(3) The $CaF_2$ content of the baked flux F10 is in excess of 24%. The baked flux F10 made arcs unstable and caused weld defects such as inferior beads and slag inclusion.

(4) The $Al_2O_3$ content and the $MgO/Al_2O_3$ ratio of the baked flux F11 are less than 8% and in excess of 2.5, respectively. The baked flux F10 made slag removability unsatisfactory, formed convex beads remarkably spoiling the facility of welding work and caused weld defects such as lack of fusion and slag inclusion.

(5) The $Al_2O_3$ content of the baked flux F12 is in excess of 20%. The baked flux F12 reduced the low-temperature toughness of the weld metal and made slag removability unsatisfactory remarkably spoiling the facility of welding work.

(6) The MgO content of the baked flux F13 is less than 20%. The baked flux F13 reduced the low-temperature toughness of the weld metal remarkably.

(7) The MgO content of the baked flux F14 is in excess of 40%. The baked flux F14 caused undercut and formed irregular beads remarkably spoiling the facility of welding work.

(8) The CaO content of the baked flux F15 is less than 10%. The baked flus F15 reduced the low-temperature toughness of the weld metal remarkably.

(9) The CaO content of the baked flux F16 is in excess of 30%. The baked flux F16 formed irregular beads, spoiled the facility of welding work remarkably and caused weld defects such as lack of fusion.

(10) The total content of one or more of $Na_2O$, $K_2O$ and $Li_2O$ of the baked flux F17 is less than 1% and the bulk specific gravity of the same is less than 0.8 $g/cm^3$. The baked flux F17 made arcs unstable, formed irregular beads spoiling the facility of welding work and caused weld defects such as lack of fusion. Since the strength of the particles is very low, the baked flux F17 was pulverized excessively further spoiling the facility of welding work.

(11) The total content of one or more of $Na_2O$, $K_2O$ and $Li_2O$ of the baked flux F18 is in excess of 7% and the bulk specific gravity of the same is in excess of 1.3 $g/cm^3$. The baked flux F18 was unsatisfactory in spreading over the surface of the groove, caused weld defects such as convex beads, pockmarks and lack of fusion, and spoiled the facility of welding work.

(12) The $SiO_2$ content of the baked flux F19 is less than 7%. The baked flux F19 formed convex beads, spoiled the facility of welding work and caused weld defects including lack of fusion.

(13) The $SiO_2$ content of the baked flux F20 is in excess of 27%. The baked flux F20 reduced the low-temperature toughness of the weld metal remarkably, formed irregular beads and caused the burning of slag spoiling the facility of welding work.

(14) The $MgO/Al_2O_3$ ratio of the baked flux F21 is less than 1.5. The baked flux F21 reduced the low-temperature toughness of the weld metal remarkably, formed irregular beads and spoiled the facility of welding work.

(15) The bulk specific gravity of the baked flux F24 is in excess of 1.3 g/cm. The baked flux F24 was unsatisfactory in spreading over the surface of the groove, caused weld defects such as pockmarks and lack of fusion and spoiled the facility of welding work.

(16) The respective P or S contents of the baked fluxes F25 and F26 are in excess of 0.03% or 0.05%, respectively. The baked fluxes F25 and F26 had an inclination to cause the reduction of toughness of the weld metal and caused weld defects including hot cracks.

Whereas the controls are unsatisfactory in performance as explained in items (1) to (16), the baked fluxes F1 to F6 meeting all the conditions of chemical composition according to the present invention are satisfactory in all respects including the results of impact tests and X-ray tests, and the capability of facilitating welding work. As is indicated typically in Table 5 by the baked flux F6, the baked fluxes of the present invention exhibited expected effects stably in combination with any one of the welding wires W1 to W3, which proved that the performance of the baked flux of the present invention is satisfactory regardless of the types of welding wires.

As apparent from the foregoing description, the present invention provides baked fluxes for submerged arc welding, capable of satisfactorily welding various types of low alloying steels in combination with various types of welding wires.

Although the present invention has been described in its preferred embodiments, it is to be understood to those skilled in the art that the present invention may be embodied in many chemical compositions without departing from the scope and spirit thereof.

What is claimed as new and desired to be secured by Letters Patent of the United States is:

1. A baked flux for submerged arc welding, consisting essentially of:
2-10 wt. % $CO_2$ equivalent of a metal carbonate, 12-24 wt. % $CaF_2$, 8-20 wt. % $Al_2O_3$, 20-40 wt. % MgO, 10-30 wt. % CaO, 7-27 wt. % $SiO_2$, 1-7 wt. % of at least one member selected from the group consisting of $Na_2O$, $K_2O$ and $Li_2O$, 0.03 wt. % or less P, 0.05 wt. % or less S, and 0.3 wt. % or less 1000° C. water, wherein the bulk specific gravity of said baked flux is between 0.8-1.3 $g/cm^3$ and wherein $1.5 \leq MgO/Al_2O_3$ ratio $\leq 2.5$.

2. The flux of claim 1, wherein said metal carbonate is selected from the group consisting of $CaCO_3$, $MgCO_3$, $MnCO_3$, and $BaCO_3$.

3. The flux of claim 2, wherein said metal carbonate is selected from the group consisting of $CaCO_3$, $MgCO_3$, and $BaCO_3$.

* * * * *